United States Patent Office 3,216,654
Patented Nov. 9, 1965

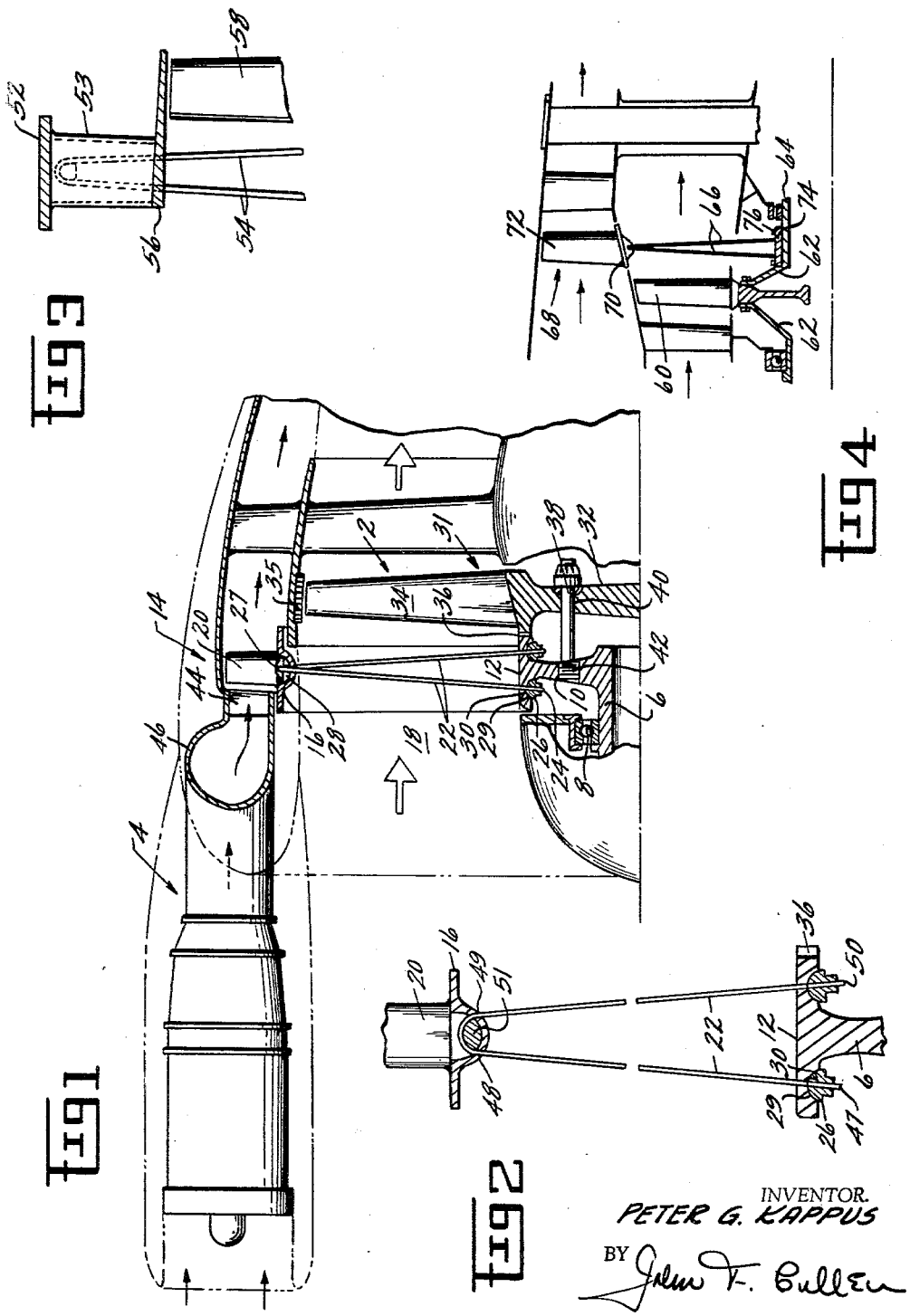

3,216,654
TURBOFAN ENGINE
Peter G. Kappus, Cincinnati, Ohio, assignor to General Electric Company, a corporation of New York
Filed Dec. 23, 1963, Ser. No. 332,591
13 Claims. (Cl. 230—116)

This invention relates to turbofan engines and, more particularly, to a turbine and fan assembly of a turbofan engine.

Conventional turbofan engines, which are used in combination with turbojet engines to form what is commonly called a "fan jet" engine, employ an integral turbine-fan assembly, the turbine blades being attached directly to the fan blades on either the radially inward or outward end of the fan. Many disadvantages arise from such an assembly, most of them arising because of the integrated structural relationship of the turbine and fan blades. The turbine blades, because they are powered by the very hot exhaust gases emanating from the turbojet section of the fan jet engine, are required to be fabricated from heat-resistant steel alloys. The fan blades, however, are only exposed to cool ambient air and, therefore, need not be formed from such heavy and expensive material. In fact, it would be preferable to form the fan blades out of a lightweight inexpensive material such as reinforced synthetic resinous materials. Permitting such a variance in material of two integrally connected blades requires a very efficient insulating seal between the turbine blades and the fan blades. Furthermore, from an engineering standpoint, it is desirable to have the power producing portion of the turbofan engine, i.e., the turbine, radially outwardly from the rotor hub. This is accomplished by placing the turbine blades at the outer tip of the fan blades. However, mounting the heavy turbine blades on the tip of the fan blades increases the stresses in the fan blades during rotation and requires a fan blade structure sufficiently strong to not only withstand the centrifugal forces resultant from the mass of the fan blades themselves, but in addition the fan blades must be made sufficiently strong to withstand the forces imparted thereto by the turbine blades. Considering that the turbine blades are formed of steel alloys, these additional stresses can be of significant magnitude. The above-mentioned considerations increase the cost and the weight of the turbofan engine.

Another disadvantage, and perhaps the most important disadvantage of the integral turbine-fan structure is the necessity of disassembling the turbine from the engine when it is required merely to replace or repair the fan. Because the fan portion of the turbofan engine ingests atmospheric air it is quite common for foreign matter to similarly be ingested. Impingement of the foreign matter on the fan portion of the turbofan often causes damage to the fan blades which requires replacement or repair of the fan. Present-day turbofan structure requires disassembling of the rotor bearings and of the turbine when maintenance of the fan is necessitated. If a fan blade need be replaced, the turbine blade must be removed from the fan blade and attached to the fan blade replacement. Upon installation of the repaired turbofan assembly within the engine realignment and balancing is mandatory. It is obvious that maintenance costs of turbofan engines are, therefore, quite high.

The turbofan engine of the present invention eliminates the above-discussed disadvantages by providing a turbine-fan assembly having the turbine blades mounted independently from the fan blades.

Accordingly, it is one object of the present invention to provide an inexpensive, lightweight and easily maintainable turbofan engine.

It is another object of the present invention to provide an improved turbofan engine permitting independent removal and repair of the fan portion thereof.

Further objects and attendant advantages of this invention will become better understood from the following description.

Briefly stated, this invention in one form provides an improved turbofan engine comprising a tip-turbine and fan mounted independently of one another on a rotatably mounted hub. The tip-turbine includes a plurality of circumferentially spaced turbine blades mounted on an annular rim which is spaced from and concentric with the hub. The turbine rim and hub together define an annular airflow path. A plurality of circumferentially spaced, wiry spokes, radiating from said hub and attached under tension to the rim, help support the rim and turbine blades. The fan includes a disk having circumferentially spaced fan blades integrally formed on the outer periphery of the disk so as to radially span the annular airflow path. A torque-transmitting coupling, such as a curvic coupling, is provided on the fan disk and hub effecting a driving relationship between the tip-turbine and the fan through the hub and coupling while permitting independent removal of the fan from the hub for repair and replacement purposes.

While the specification concludes with claims particularly pointing out and distinctly claiming the subject matter which is regarded as the invention, it is believed that the invention will be better understood from the following description taken in connection with the accompanying drawings in which:

FIG. 1 is a schematic cross-sectional illustration of a turbofan engine formed in accordance with a first embodiment of the present invention;

FIG. 2 is a schematic cross-sectional illustration of a modification of the turbofan engine of FIG. 1;

FIG. 3 is a schematic illustration of a portion of a turbofan engine and support arrangement formed in accordance with a second embodiment of the present invention;

FIG. 4 is a schematic cross-sectional illustration of a portion of a turbofan engine formed in accordance with a third embodiment of the present invention.

With reference to the drawing and, in particular, FIG. 1, there is shown a turbofan engine 2 arranged for operation with a turbojet type gas generator 4. The turbofan engine 2 is of the type generally referred to as a tip-turbofan engine and includes a rotatably mounted hub 6 supported by any conventional support means such as a bearing 8. One end of the hub has a flared portion 10 thereon which, in turn, has a flanged section 12 at the radial outer extremity thereof.

Concentric with the hub 6 and radially spaced therefrom is mounted a tip-turbine 14 comprising an annular rim 16 which, in combination with the flanged section 12 of the hub 6, defines an annular airflow passage 18 therebetween. A plurality of circumferentially spaced turbine blades, one of which is shown at 20, extend radially outwardly from the turbine rim 16. The turbine blades 20 are attached to the turbine rim 16 by any conventional means, for example a dovetail connection or a pinned connection.

In order to drivingly interconnect the tip-turbine 14 and the hub 6 and to help support the tip-turbine 14, a plurality of circumferentially spaced spokes 22 are provided. The spokes are employed in a manner similar to the spokes of a bicycle wheel. They are attached at their inner ends 24 to the hub 6 by any suitable means, such as by threaded engagement with a boss 26 mounted on the radially inner side of the hub flanged section 12. The spokes are attached at their radially outer ends 27 to the turbine rim 16 by threaded engagement with a boss 28 or by any other means which will hold the spokes 22 on the rim 16 without permitting the spokes to be pulled radially downwardly relative thereto. Through at least one of the threaded mounting bosses 26 or 28 the spokes are placed under sufficient tension to provide proper support for the tip-turbine 14 during operation. The boss 26 is provided with an arcuate surface 29 which mates with an arcuate depression 30 formed in the inner side of the flanged section 12. This arrangement permits self-alignment of the turbine and simplifies the mounting thereof.

Because the spokes have a very small diameter relative to the area through which they pass, i.e., the airflow passage, they may be used in their normal circular cross-sectional shape without any detrimental areodynamic effects. However, in some particular applications it is desirable to provide spokes having a lenticular cross-sectional shape, i.e., an aerodynamic shape. The spokes may be formed of any high-tensile stress wiry material, for example steel wire or piano wire. Furthermore, because the spokes are not directly exposed to the hot exhaust gases which propel the tip-turbine 14, it is possible to use high-tensile stress, non-metallic material such as glass fiber.

A modification of the turbine mounting of the first emmodiment illustrated in FIG. 1 is illustrated in FIG. 2.

Instead of attaching one end of the spokes 22 to the hub 6 and the other end to the rim 16, the spokes 22 are attached at one end 47 to the hub 6, passed up through one aperture 48 in the rim 16, down through another aperture 49 and attached at the other end 50 to the hub 6. The spokes 22 can be attached to the hub 6 by threaded bosses or any other suitable means which permit easy removal from the hub as well as adjustment of the tension of the spokes. A block 51 is provided between the two apertures 48, 49 over which the spokes are bent. This permits gradual curvature of the spokes as contrasted with sharp bends which would occur if the block 51 was not present.

The fan portion 31 of the turbofan engine 2 comprises a preferably axially spaced disk 32 which may be upstream or downstream as shown having a plurality of circumferentially spaced fan blades, one of which is shown at 34 extending radially from the outer periphery thereof. The fan blades 34 are of sufficient length to span the annular airflow path 18 between the flanged section 12 of the rotor hub 6 and the turbine rim 16. Sealing means, for example a honeycomb or labyrinth seal 35, is provided between the tip of the fan blades 34 and the turbine rim 16. The seal 35, in addition to providing proper flow differentiation between the hot exhaust gases and the cool ambient air, also helps insulate the fan blades 34 from the high temperature turbine region. Because of the independent structural relationship between the tip-turbine 14 and the fan 31 there is no heat flow path directly between the turbine and the fan. Therefore, the fan 31 can be fabricated from a glass fiber reinforced, synthetic, resinous material which is light in weight, easily workable and inexpensive. Furthermore, rather than forming the fan blades 34 individually and independently of the fan disk 32, by the structure of the present invention it is possible to manufacture the entire fan 31 as an integral unit thus providing a strengthened fan which is easily and inexpensively manufactured.

The fan 31 is drivingly coupled to the hub 6, and, in turn, to the tip-turbine 14 through any conventional torque-transmitting coupling means, such as a curvic coupling 36. The curvic coupling 36 comprises a plurality of circumferentially spaced projections which extend axially from the downstream end of the flanged section 12 of the rotor hub 6 and which interdigitate with corresponding projections extending axially from the upstream end of the fan disk 32. The interdigitating relationship between the axially extending projections provide torque transmission from the hub 6 to the fan 31. In order to maintain the fan 31 in proper torque-transmitting relationship with the hub 6 and to prevent relative axial motion therebetween, a plurality of circumferentially spaced fastening means, such as bolts 38, extend axially through bolt holes 40, 42 passing through the fan disk 32 and flared portion 10 of the hub 6 respectively. While a plurality of circumferentially spaced bolts 38 can be used to properly mount the fan 31 onto the hub 6, it is also possible to use a single, centrally mounted bolt (not shown) in lieu of the plurality of bolts 38.

In operation, the tip-turbine 13 is rotatably propelled by an energy interchange between the tip-turbine blades 20 and the hot exhaust gases emanating from the gas generator 4. The exhaust gases are directed at the proper angle to the tip-turbine blades 20 by suitable means such as guide vanes 44 mounted wtihin the inlet scroll 46 of the tip turbine. The rotational force exerted on the tip-turbine blades 20 is transmitted to the hub 6 through the spokes 22 resulting in rotation of the hub 6 and, by means of the torque-transmitting coupling 36, the hub 6 rotatably drives the fan 31. Ambient or bypass air passes through the airflow passage 18 and is acted upon by the fan blades 34 from which the air exhausts through a turbofan nozzle (not shown) to the atmosphere providing a thrust increase.

In the first embodiment illustrated in FIG. 1, the turbine rim 16 is mounted on the radially inner end of the tip-turbine blades 20. A second embodiment of this invention, illustrated in FIG. 3, involves the mounting of a turbine rim 52 on the radially outer end of the tip-turbine blades 53. In this manner the turbine blades 53 extend radially inwardly from the turbine rim 52. Access to the rim 52 for the supporting spokes 54 is provided through the turbine blades 53 by employing conventional hollow, sheet metal turbine blades. An airflow path for the ingested ambient or bypass air is defined by the hub and by sealing means 56 mounted on the tips of the turbine blades 53 adjacent the tips of the fan blades 58. The remaining structure of the tip-turbofan formed in accordance with this second embodiment is the same as that discussed above with regard to the first embodiment of FIG. 1.

The third embodiment, illustrated in FIG. 4, interchanges the location of the fan blades and turbine blades on a turbofan engine and still provides the independent structural relationship therebetween. In the third embodiment a plurality of circumferentially spaced turbine blades 60 are mounted by conventional struts 62 on a rotor hub 64. Immediately adjacent the turbine section of the turbofan engine and, as shown, preferably axially downstream thereof and attached to the hub 64 by means of circumferentially spaced spokes 66 is the fan portion 68 of the turbofan engine. The fan comprises a fan rim 70 from the outer periphery of which a plurality of fan blades 72 extend radially outwardly. As discussed above with respect to the first embodiment of FIG. 1, the spokes 66 are attached at their radially inner ends to the hub 64 and at their radially outer ends to the fan rim 70 in a manner so as to place the spokes under tension. An alternative to mounting the radially inner end of the spokes 66 directly to the hub 64, which complicates the removal of the fan from the turbofan engine, is to provide a ring 74 which is attached to the hub 64 by bolts 76 and to which the spokes are attached. In this manner, by removing the ring 74, which can be formed in multiple parts or unitarily, the fan 68 can be removed from the engine without disturbing the turbine or its bearing structure.

This invention provides a turbofan engine wherein the fan portion is structurally independent of the turbine portion. Such independence permits the use of lightweight, inexpensive material in fabricating the fan and facilitates rapid and simple mounting and demounting of the fan from the hub portion of the turbofan engine in much the same way as an automobile wheel is mounted and demounted. This eliminates the expense and the time-consuming operation of disassembling the turbine section from the fan section as is required in conventional turbofan engines.

It should be understood that while the specific forms of this invention have been shown and described above, it will be apparent to those skilled in the art that numerous changes and substitutions or equivalents might be made. For example, the particular axial orientation of the turbine section relative to the fan section could be altered. Therefore, it is contemplated by the claims which conclude the specification to cover all such modifications as fall within the true spirit and scope of this invention.

I claim:
1. A turbofan engine comprising,
 (a) a rotatably mounted hub,
 (b) a turbine mounted on said hub in driving relationship therewith,
 (c) a fan removably coupled to said hub in driving relationship therewith,
 (d) means in the engine defining an airflow passage,
 (e) the blades of said turbine and fan being radially displaced from one another, the blades of said fan being mounted within said airflow passage, the blades of said turbine being mounted externally of said airflow passage and said fan and turbine being independently removable from said hub.
2. A turbofan engine as described in claim 1 wherein said fan and turbine are axially spaced from one another.
3. A turbofan engine as described in claim 1 wherein said fan is disposed axially downstream of said turbine.
4. A turbofan engine comprising,
 (a) a rotatably mounted hub,
 (b) a tip-turbine including an annular rim radially spaced from said hub and a plurality of circumferentially spaced turbine blades mounted on said rim, said rim and said hub defining an annular airflow passage therebetween,
 (c) means for mounting said tip-turbine on said hub in driving relationship therewith,
 (d) a fan having a central support portion and a plurality of circumferentially spaced fan blades on the periphery thereof, said fan being mounted independently of said turbine and radially displaced from said turbine blades, said fan blades radially spanning said passage between said hub and said rim, said turbine blades being mounted externally of said passage, and
 (e) means for removably coupling said fan to said hub in driving relationship therewith, said fan being removable from said hub independently of said turbine.
5. A turbofan engine as described in claim 4 wherein the tip-turbine mounting means comprises a plurality of circumferentially spaced spokes being attached to and extending from said hub to said rim.
6. A turbofan engine as defined in claim 5 wherein said spokes are formed of a wiry material having a lenticular cross-section.
7. A turbofan engine as defined in claim 5 wherein said turbine blades are mounted on the radially outer surface of said rim.
8. A turbofan engine as defined in claim 5 wherein,
 (a) said turbine blades are mounted on the radially inner surface of said rim,
 (b) each of said turbine blades has a passage extending radially therethrough, and
 (c) at least one of said spokes extending radially through said passage in each of said turbine blades.
9. A turbofan engine comprising,
 (a) a rotatably mounted hub,
 (b) a tip-turbine including an annular rim radially spaced from and concentric with said hub and a plurality of circumferentially spaced turbine blades mounted on said rim, said rim and said hub defining an annular airflow passage therebetween,
 (c) means for mounting said turbine on said hub in driving relationship therewith, said means including a plurality of circumferentially spaced wiry spokes mounted at one end to said hub and mounted at the other end to said rim,
 (d) a fan including a disk and a plurality of circumferentially spaced fan blades integrally formed on the periphery of said disk, said fan being mounted independently of said turbine and radially displaced from said turbine blades, said fan blades radially spanning said passage between said hub and said rim, and
 (e) coupling means for removably connecting said fan to said hub in driving relationship therewith, said fan being removable from said hub independently of said turbine.
10. A turbofan engine as defined in claim 9 wherein said fan is formed from a synthetic resinous material.
11. A turbofan engine as described in claim 9 wherein said fan coupling means comprises a plurality of circumferentially spaced first projections extending from said hub and a plurality of corresponding circumferentially spaced second projections extending from said disk, said second projections interdigitating with said first projections to provide a torque-transmitting coupling.
12. A turbofan engine comprising,
 (a) a rotatably mounted hub,
 (b) a turbine fixedly mounted on said hub in driving relationship therewith,
 (c) a fan including an annular rim spaced from and concentric with said hub and a plurality of circumferentially spaced fan blades mounted on said rim, said fan blades being displaced radially outwardly from said turbine,
 (d) means for removably coupling said fan to said hub in driving relationship therewith, said fan being removable from said hub independently of said turbine, said means including a plurality of circumferentially spaced spokes being attached to and extending from said hub to said rim.
13. A turbofan engine as described in claim 12 wherein said fan is disposed axially downstream of said turbine.

References Cited by the Examiner
UNITED STATES PATENTS

| 2,030,622 | 2/36 | Ceglowski | 230—116 |
| 2,868,439 | 1/59 | Hampshire et al. | 253—77 |

FOREIGN PATENTS

| 590,141 | 7/42 | Great Britain. |

DONLEY J. STOCKING, *Primary Examiner.*
ROBERT M. WALKER, *Examiner.*